US005225022A

United States Patent [19]

Baker et al.

[11] Patent Number: 5,225,022

[45] Date of Patent: * Jul. 6, 1993

[54] METHOD FOR MAKING AN IMPROVED RESEALABLE OUTSERT LABEL

[75] Inventors: Byron L. Baker; Carol A. Bentz; Todd E. Mundis, all of York; Keith M. Kohr, Jacobus, all of Pa.

[73] Assignee: Uarco Incorporated, Barrington, Ill.

[ * ] Notice: The portion of the term of this patent subsequent to Sep. 22, 2009 has been disclaimed.

[21] Appl. No.: 805,884

[22] Filed: Dec. 12, 1991

[51] Int. Cl.[5] .................... B32B 3/00

[52] U.S. Cl. .................... 156/277; 156/291; 156/289; 156/324

[58] Field of Search .................... 156/291, 277, 289, 324

[56] References Cited

U.S. PATENT DOCUMENTS 4,711,686 12/1987 Instance .................... 156/227

4,790,563 12/1988 Instance .................... 283/81

5,021,273 6/1991 Kobayashi .................... 156/277 X

*Primary Examiner*—David A. Simmons

*Assistant Examiner*—Chester T. Barry

*Attorney, Agent, or Firm*—Samuel M. Learned, Jr.

[57] ABSTRACT

A method for making an improved resealable outsert label wherein following sequential text and illustrative imprinting upon panel components thereof the base layer panel upper surface of the label is next imprinted with a release-reseal coating strip to be thereafter followed by a curing thereof and then a skip-printing of the label cover panel hinge adhesive directly upon the base layer panel upper surface and abuttable to the previously laid down release-reseal coating strip, with a second strip of like adhesive, being a strip of label cover panel reseal tab adhesive, imprinted directly over the release-reseal coating strip, and then application of the label cover panel which is bondably adhered to the label base layer at the cover hinge end thereof by the label cover panel hinge adhesive and releasably adhered to the label base layer at the reseal tab end thereof by the reseal tab adhesive.

2 Claims, 3 Drawing Sheets

METHOD FOR MAKING AN IMPROVED RESEALABLE OUTSERT LABEL

BACKGROUND OF THE INVENTION

The present invention relates to a method for making an improved resealable outsert label of that type disclosed and taught in Assignor's previously entered copending application bearing Ser. No. 07/779,962 filed on Oct. 21, 1991, under the Title of "IMPROVED RESEALABLE OUTSERT LABEL" now U.S. Pat. No. 5,149,587.

In the current business environment it is essential that manufacturers of consumer goods limit as much as possible their exposure to product liability claims, and an effective way to do this is to attach labels directly to the product containers which give clear instructions as to proper use of the product, as well as warnings and cautions with regard to mis-use of the product. Because of the increasing amount of label text and illustrative matter that must be printed and applied to the product container in order to properly and adequately address product liability issues and exposure, as compared to the available surface area on a typical product container, the family of self-adhering resealable outsert labels were developed wherein such a label in effect comprises a resealable fold-out booklet affixed directly to and carried right upon the product container.

The per-unit cost of labelling consequently increases correspondingly with an increase in the complexity and effective size of that resealable outsert label structure used, which cost increase is to an extent somewhat offset by the reduction in cost consequence of an otherwise higher product liability exposure and risk. Another area, however, where per-unit cost of labelling can be moderated is in the manufacturing method employed to make the labels, and if the manufacturing method therefore is suitably accomplished on standard label printing and converting equipment at normal production speeds, then the manufacturing economies are substantially enhanced. In this latter regard, structural design of the label is of a primary consideration.

Exemplary prior art teachings showing the manufacture of self-adhering resealable outsert label structures which open by tear line means are those as respectively set forth in U.S. Pat. No. 4,711,686 dated Dec. 8, 1987, to Instance and U.S. Pat. No. 4,790,563 dated Dec. 13, 1988, also to Instance, which may be regarded as generally typical of the present self-adhering resealable outsert label manufacturing technology.

The applicant's method for making an improved self-adhesive resealable outsert label, however, as distinguished from the foregoing teachings, employs standard label printing and converting equipment operated at normal production speeds whereby a structurally enhanced label product is commercially produced at optimum label manufacturing economies.

SUMMARY OF THE INVENTION

It is the principal object of the present invention to provide a method for making an improved resealable outsert label by employing standard printing and conversion equipment which is utilized in a new and novel label imprinting and component assembly sequence.

It is also an object of the present invention to provide a method for making an improved resealable outsert label which produces a succession of such labels on a length of carrier liner backing material.

It is an additional object of the present invention to provide a method for making an improved resealable outsert label on a commercial scale which comprises a simple and inexpensive production technique.

The foregoing, and other objects hereof, will be readily evident upon a study of the following specification and accompanying drawings comprising a part thereof.

DETAILED DESCRIPTION OF THE INVENTION

Figure 1:
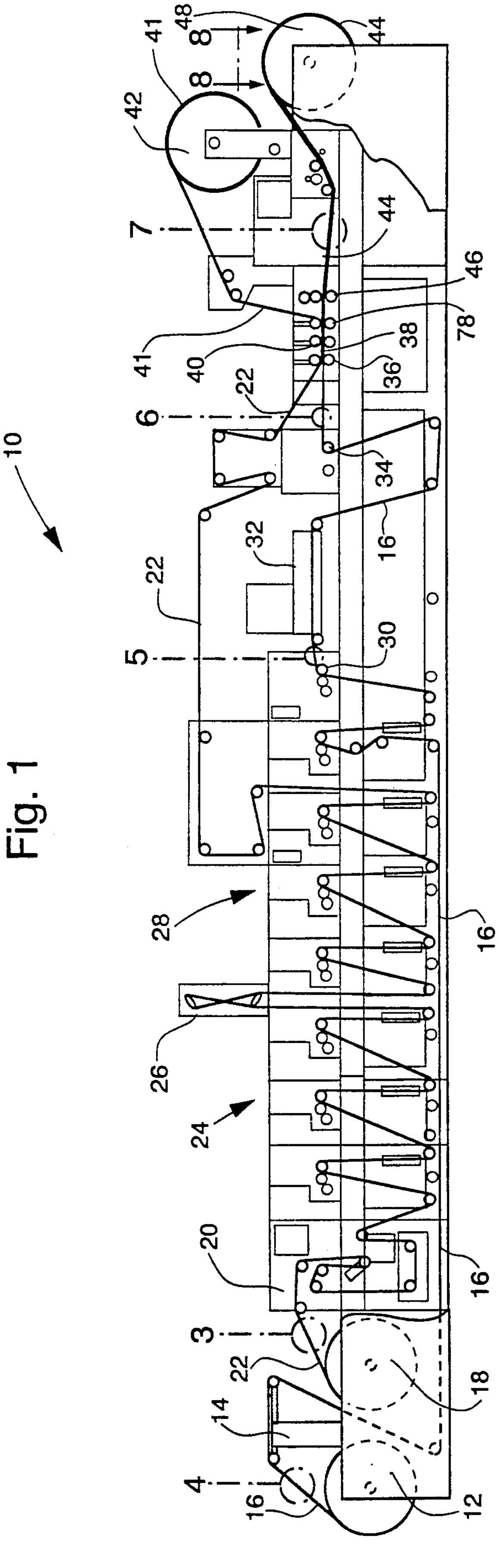
FIG. 1 is a side elevation view of a typical label printing and conversion machine which is exemplary of those types currently employed in general commercial label printing operations, therein showing the label imprinting and component assembly sequence of that method as hereinafter disclosed and described.

Referring to FIG. 1, a standard label printing and conversion line 10 is shown in a simplified side elevation cut-away view thereof, being typical of such equipment currently in general use in modern self-adhering resealable outsert label manufacturing operations, which illustration is intended to be exemplary only and not per se limiting. Typically included in such a line 10, however, will be a label base material infeed roll stand 12 and a label base material infeed web metering and tensioning device 14 from and through which a composite label material web 16 is infed to the line 10, as well as a label cover material infeed roll stand 18 likewise being provided with a cover material infeed web metering and tensioning device 20 respectively from and through which a cover material web 22 is infed to the line 10.

Typically, the base material 16 is a composite laminate structure furnished as a substantially pre-processed component to the line 10, to be assembled with the cover material 22 after cover material printing by first printing units 24 then passing through a cover material web inverter 26 and second printing units 28. Concurrent therewith the base material web 16 advances through release-reseal coating imprint station 30 and then through release-reseal coating curing unit 32 to the cover panel hinge and reseal tab adhesive imprinting station 34, to be thereafter compressively joined in register with the cover material web 22 at the compression roller nip 36 to thus form a label web 38. The label web 38 then passes through a die-cut roller section 40 wherein the individual labels are die-cut down to the carrier liner layer for removal of the material excess 41 which is stripped off and accumulated on the waste reel 42 while the then formed succession of carrier liner mounted individual labels 44 pass through the label compression rollers 46 and onto the label web take-up reel 48.

Generally, the foregoing description of the material flow and operational processing steps performed during passage of the base material web 16 and the cover material web 22 are typical for the respective transits thereof up to exit from the respective printing units 24 and 28, and specific to the teaching hereof thereafter. With regard to the foregoing, it is to be understood that the line 10 could alternately be webbed to pass the base material web 16 through the first printing units 24 and the cover material web 22 through the second printing units 28, or any other webbing configuration desired, and that that which is illustrated in FIG. 1 with respect to the printing units 24 and 28 in combination with the web inverter 26 is to be considered as exemplary only for purposes of discussion herein.

Figure 2:
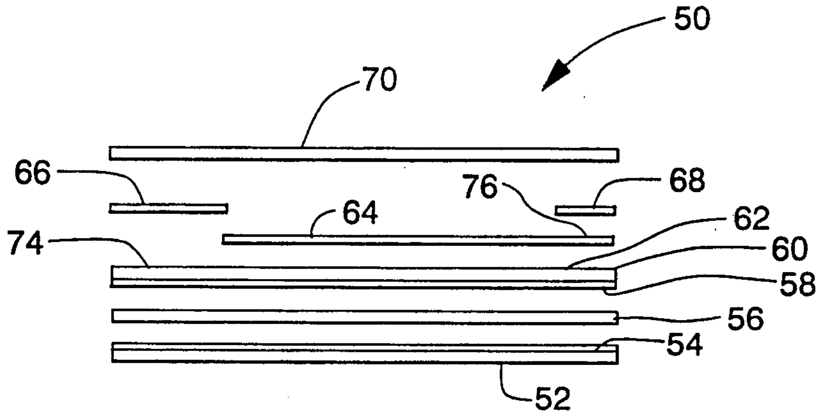
FIG. 2 is an exploded pre-assembly side elevation view of the various component segments comprising the improved resealable outsert label produced by the method hereof.

Referring now to FIG. 2, wherein is shown an exploded preassembly side elevation view of the various component segments comprising the improved resealable outsert label 50 produced by the method as herein taught. From the bottom of FIG. 2 up, the carrier liner upon which the assembled label 10 is supported and from which it is subsequently removed for application to a use surface is shown as the lowermost component of the laminate label structure, to which carrier liner 52 a layer of adhesive release medium 54 is applied and functions to facilitate peelable removal release of the carrier liner 52 from the pressure sensitive adhesive layer 56 for use application of said label 50. The pressure sensitive adhesive bonding medium 58 imprinted upon the lower surface of the base layer 60 and which functions to effect secure affixment bonding of the pressure sensitive adhesive layer 56 to the base layer 60 so the label 50 assembly is made to functionally withstand rigors of use employment in the application environment wherein the base layer upper surface 62 is usually pre-printed with label information.

Novel to the method hereof, and as part of the method hereof, the liquid release-reseal coating strip 64 is imprinted upon the base layer 60 upper surface 62 over any pre-printed label information thereon, and with the release-reseal coating strip 64 being colorless and transparent any base layer 60 upper surface 62 label information clearly shows therethrough. Next, as an additional part of the method thereof, the cover panel hinge adhesive 66 and the reseal tab adhesive 68 are simultaneously skip-imprinted with the hinge adhesive 66 being applied directly to the base layer 60 and the tab adhesive 68 to the release-reseal coating strip 64. And lastly, and further as a part of the method hereof, the printed label cover panel 70 is assembled to the label 50 structure being held in place by bondable adhesion at one end thereof to the hinge adhesive 66 and at the other end thereof releasably to the reseal tab adhesive 68.

Figure 4:
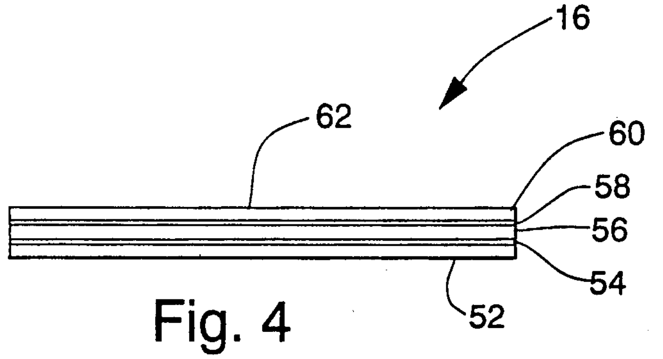
FIG. 4 is a side elevation view of a segment of the composite label support layer web as illustrated at position 4 of FIG. 1.

As shown in FIG. 2, there is typically a pre-assembly of the adhesive release medium 54 to the carrier liner 52 and the pressure sensitive adhesive bonding medium 58 to the base layer 60, wherein these pre-assembled components are then joined by an adhesive layer 56 to thereby form the composite label base material web 16 as illustrated in FIGS. 1 and 4, which is then infed to the printing and conversion line 10.

Considering now FIGS. 3 through 8 in view of the method hereof as illustrated in FIG. 1, particularly with respect to the various numbered processing stages shown in FIG. 1 as respectively corresponds to the remaining Figures.

Figure 3:
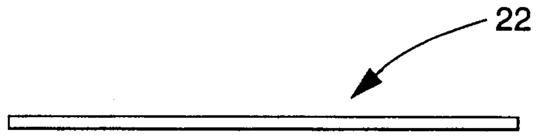
FIG. 3 is a side elevation view of a segment of the label cover panel web as illustrated at position 3 of FIG. 1.

The view shown in FIG. 3 is a side elevation of the label cover material web 22 as illustrated at position 3 of FIG. 1 as it is delivered from the infeed roll stand thereof into the web metering and tensioning device 20. In the exemplary illustration of FIG. 1, the label cover material web, as would be typical, is then passed through the first printing unit 24 for a first three-color impression printing of label text and illustrative matter on the one side thereof, then passed through the web inverter 26 for turn-over and a three-color impression printing of label text and illustrative matter on the other side thereof.

Concurrent with the foregoing, the composite label base material web 16 as shown in side elevation in FIG. 4 and as illustrated at position 4 of FIG. 1, is delivered from the infeed roll stand 12 therefor into the web metering and tensioning device 14 for forwarding to the release-reseal coating imprint station 30. It is at the release-reseal coating imprint station 30 where the first of combined steps of the method hereof is carried out, which is imprinting of the release-reseal coating strip 64 upon the base layer upper surface 62 as illustrated in FIG. 5 and shown at position 5 of FIG. 1.

Figure 5:
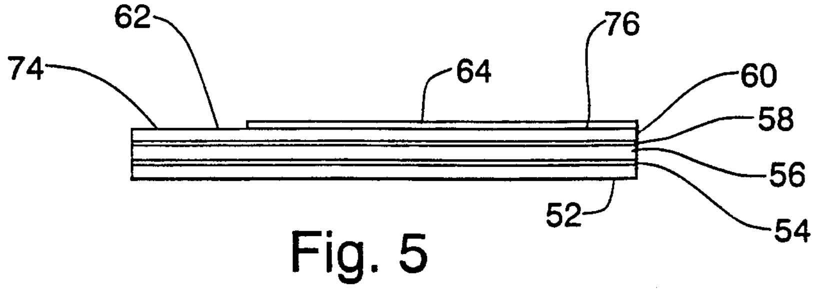
FIG. 5 is a side elevation view showing imprinting of the release-reseal coating strip upon a segment of the composite label support layer web as illustrated at position 5 of FIG. 1.

The purpose for causing an imprint profile of a release-reseal coating strip 64 as shown in FIG. 5 is to provide an adhesion differential between the panel hinge 74 where there is no release-reseal coating imprint and the release tab connection area where there is such an imprint, being integral within the label structure per se, to thereby provide a profile which better withstands inadvertent user attempts to open the label from the cover hinge side, being the wrong side, which would otherwise cause label damage. Since the cover panel hinge 74 is provided with a more substantial adhesive layer, and has no inclusion of an adhesion weakening film, a user is discouraged from sustained attempts to open the label from that side and will in most cases then proceed to open the label properly from the release-reseal tab side.

Figure 6:
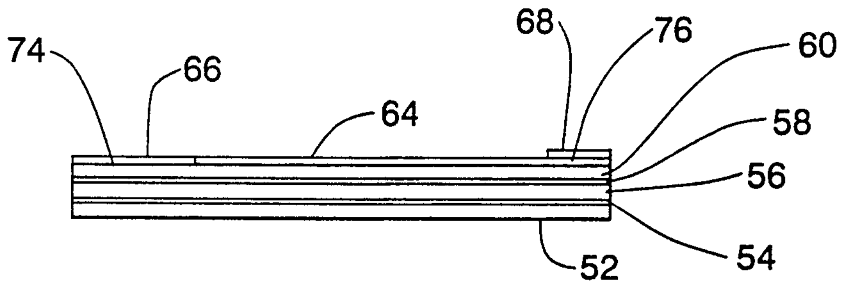
FIG. 6 is a side elevation view showing skip imprinting of the cover panel hinge adhesive and reseal tab adhesive upon a segment of the composite label support layer web as illustrated at position 6 of FIG. 1.
Figure 7:
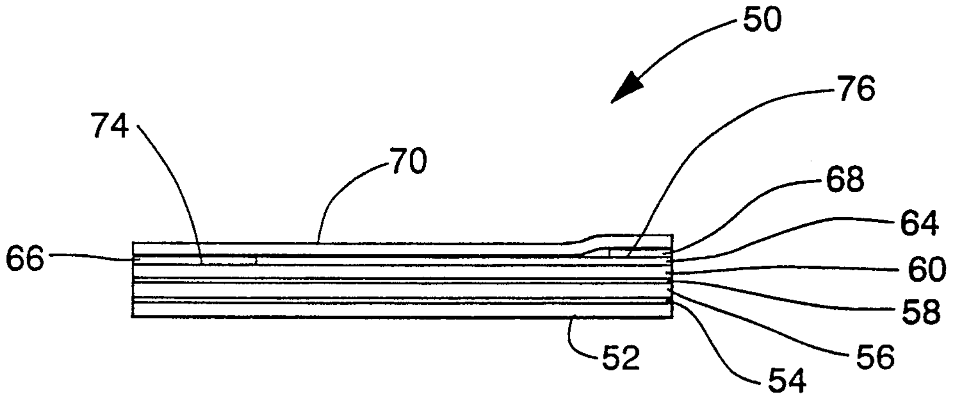
FIG. 7 is a side elevation view of an improved resealable outsert label as produced by the method of instant invention.
Figure 8:
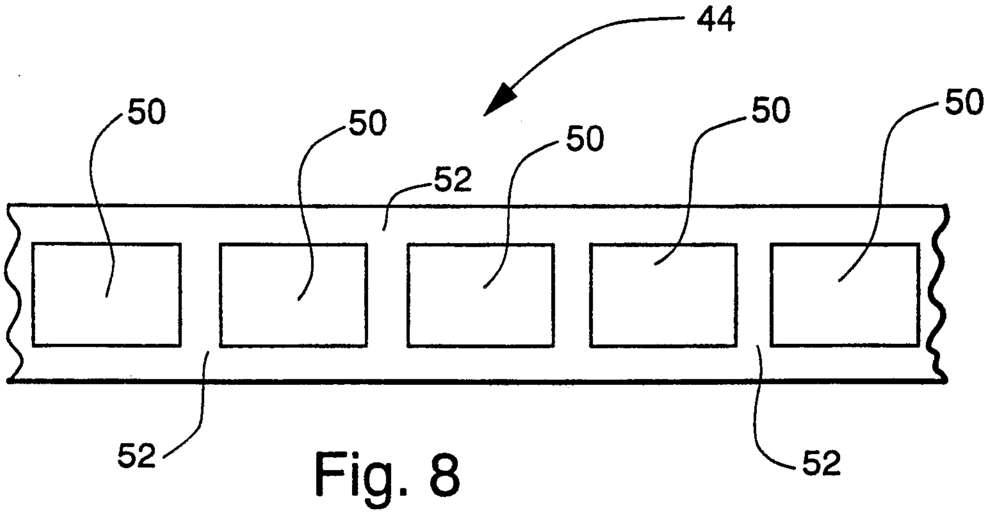
FIG. 8 is a top plan view of the output product web at the take-up reel position, as seen at 8—8 of FIG. 1, therein showing a succession of the improved resealable outsert labels on a length of carrier linear backing material.

Following imprint of the release-reseal coating strip 64 at the release-reseal coating imprint station 30, the base material web 16 passes through the release-reseal coating curing unit 32 to set and cure the coating strip 64, and then on to the cover panel hinge and reseal tab adhesive imprinting station 34 for skip-print imprinting of the cover panel hinge adhesive 66 and reseal tab adhesive 68 as shown in FIG. 6 and as illustrated at position 6 of FIG. 1, which is the second of combined steps of the method hereof.

The skip-printing technique for accomplishing a spaced application of adhesive enables the respective adhesive strips to be applied upon those areas of the label 10 structure which will most suitably yield the desired bonding differential functional results sought after in achieving a resealable label utilization role, that is, application of the cover panel hinge adhesive 66 so that it directly bonds the label cover panel 70 to the base layer 60 for maximum connective strength to maintain the label structural integrity during actual use, and application of the reseal tab adhesive 68 over the release-reseal coating strip 64 so there is a reduced adhesion of the label 10 structural components in the release tab connection area 76 for ease of label cover panel 70 opening and resealing, which is the third of the combined steps of the method hereof.

Following skip-printing of adhesive upon the base material web 16 at position 6 as shown in FIG. 1, the webs 16 and 22 are brought into contact in registered coincidence for the adhesive joining together thereof at the compression roller nips 36 to thereby form a combined label web 38 which immediately thereafter passes through the die-cut roller section 40 for die-cut formation of individual labels upon the carrier liner 52, and then through the stripping rollers 78 for separation of the material excess web 41 from the succession of carrier liner mounted individual labels 44 which thereafter pass through the label compression rollers 46. At this point, the individual improved resealable outsert label 50 product at processing position 7 of FIG. 1 would be as appears in FIG. 7, which as a succession of carrier liner mounted individual labels 44 would appear as shown in top plan view at 8—8 of FIG. 1, and seen in FIG. 8, proceed for rolling on the label web take-up reel 48 and the end of label processing operation methodology as herein taught.

Although the invention has been herein shown and described in what is conceived to be the most practical and preferred method, it is recognized that departures may be made therefrom within the scope thereof, which is not to be limited to the specific details disclosed herein but is to be accorded the full scope of the claims so as to embrace any and all equivalent such methods for making the subject improved resealable outsert label.

We claim:

1. A method of employing a label printing and conversion line for producing a succession of improved resealable outsert labels mounted at regularly repeating spaced intervals upon a carrier liner, comprising the steps of:

(a) infeeding a cover material web and imprinting thereon at a regularly repeating spaced succession a plurality of label cover panels, and simultaneous therewith and separate therefrom infeeding a composite label base material web having assembled thereon at said regularly repeating succession a corresponding plurality of label bases;

(b) imprinting respectively upon a portion of said plurality of label bases at said regularly repeating succession upon said label base material web a strip of liquid release-reseal coating;

(c) forwarding said release-reseal strip coated label base material web through a release-reseal coating curing unit;

(d) skip-print imprinting upon said release-reseal strip coated plurality of label bases upon said label base material web a cover panel hinge adhesive strip directly upon the label base layer upper surface and abutting said release-reseal coating strip and at a spaced interval therefrom and parallel thereto a release-reseal tab adhesive strip directly upon said release-reseal coating strip; and (e) forming completed resealable outsert labels by bringing said cover material web and said label base material web together in registered coincidence of the respective regularly repeating successions of label cover panels and label bases for bondable adhesion thereof one to the other at the label component sites respectively thereon by means of the cover panel hinge adhesive strip and release-reseal adhesion thereof by means of the release-reseal tab adhesive strip.

2. A method of employing a label printing and conversion line for producing a succession of improved resealable outsert labels mounted at regularly repeating spaced intervals upon a carrier liner, comprising the steps of:

(a) infeeding a cover material web and imprinting thereon at a regularly repeating spaced succession a plurality of label cover panels, and simultaneous therewith and separate therefrom infeeding a composite label base material web having assembled thereon at said regularly repeating succession a corresponding plurality of label bases and imprinting label textual matter thereon;

(b) imprinting respectively upon a portion of said plurality of label bases at said regularly repeating succession upon said label base material web a strip of liquid release-reseal coating;

(c) forwarding said release-reseal strip coated label base material web through a release-reseal coating curing unit;

(d) skip-print imprinting upon said release-reseal strip coated plurality of label bases upon said label base material web a cover panel hinge adhesive strip directly upon the label base layer upper surface and abutting said release-reseal coating strip and at a spaced interval therefrom and parallel thereto a release-reseal tab adhesive strip directly upon said release-reseal coating strip; and (e) forming completed resealable outsert labels by bringing said cover material web and said label base material web together in registered coincidence of the respective regularly repeating successions of label cover panels and label bases for bondable adhesion thereof one to the other at the label component sites respectively thereon by means of the cover panel hinge adhesive strip and release-reseal adhesion thereof by means of the release-reseal tab adhesive strip.

* * * * *